United States Patent
Luft et al.

(10) Patent No.: US 8,555,638 B2
(45) Date of Patent: Oct. 15, 2013

(54) INTERNAL COMBUSTION ENGINE WITH IMPROVED EXHAUST MANIFOLD

(75) Inventors: Aaron Luft, Frankfort, IN (US); Lucian Stanciu, Dayton, IN (US); Catalin Tiru, Lafayette, IN (US); Jeremy Byrd, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 200 days.

(21) Appl. No.: 13/086,798

(22) Filed: Apr. 14, 2011

(65) Prior Publication Data
US 2012/0260653 A1    Oct. 18, 2012

(51) Int. Cl.
| | |
|---|---|
| F02B 33/44 | (2006.01) |
| F02B 33/00 | (2006.01) |
| F02B 27/02 | (2006.01) |
| F02M 25/07 | (2006.01) |
| F02M 35/10 | (2006.01) |
| F01N 1/00 | (2006.01) |

(52) U.S. Cl.
USPC ............ 60/605.2; 60/602; 60/612; 60/313; 60/321; 60/323

(58) Field of Classification Search
USPC ............ 60/605.2, 602, 611, 612, 312–313, 60/321–324; 123/568.11, 568.12, 568.2, 123/564; 701/108
IPC .............. F02M 25/07,35/10; F01N 7/10, 7/08
See application file for complete search history.

(56) References Cited

U.S. PATENT DOCUMENTS

| | | | | |
|---|---|---|---|---|
| 2,230,666 A | * | 2/1941 | Martin et al. | 60/323 |
| 2,348,518 A | * | 5/1944 | Birkigt | 60/323 |
| 2,390,913 A | * | 12/1945 | Barrett | 60/321 |
| 2,423,574 A | * | 7/1947 | Barrett | 60/321 |
| 2,455,493 A | * | 12/1948 | Jacobs | 60/321 |
| 2,688,501 A | * | 9/1954 | MacLeod | 60/322 |
| 2,727,355 A | * | 12/1955 | Wosika | 60/313 |
| 3,177,649 A | * | 4/1965 | Tromel | 60/322 |
| 3,180,077 A | * | 4/1965 | Berchtold | 60/313 |
| 3,380,246 A | * | 4/1968 | Dowell | 60/322 |
| 4,159,627 A | * | 7/1979 | Monch et al. | 60/322 |
| 4,288,988 A | * | 9/1981 | Curtil | 60/313 |
| 5,069,036 A | * | 12/1991 | Schorn et al. | 60/323 |
| 5,471,835 A | * | 12/1995 | Friedman | 60/313 |
| 5,711,154 A | | 1/1998 | Baechle et al. | |
| 6,006,732 A | | 12/1999 | Oleksiewicz | |
| 6,263,672 B1 | | 7/2001 | Roby et al. | |
| 6,321,532 B1 | * | 11/2001 | Komush | 60/313 |
| 6,360,732 B1 | | 3/2002 | Bailey et al. | |
| 6,378,308 B1 | | 4/2002 | Pfluger | |

(Continued)

FOREIGN PATENT DOCUMENTS

| | | | |
|---|---|---|---|
| EP | 348727 A | * | 1/1990 |
| EP | 1734237 | | 12/2006 |

(Continued)

*Primary Examiner* — Thai Ba Trieu
(74) *Attorney, Agent, or Firm* — Leydig, Voit & Mayer

(57) ABSTRACT

An internal combustion engine includes a plurality of combustion cylinders, at least one turbocharger, an air supply line, an exhaust gas line and an exhaust gas recirculation system. An exhaust manifold of the exhaust gas line may have both non-direction specific and modular pulse exhaust manifold elements. If the internal combustion engine has dual cylinder banks, an exhaust gas balance tube may extend between exhaust gas lines of the cylinder banks and be fluidly connected to an exhaust manifold between the ends thereof.

18 Claims, 5 Drawing Sheets

(56) References Cited

U.S. PATENT DOCUMENTS

| | | | |
|---|---|---|---|
| 6,425,381 B1 | 7/2002 | Rammer | |
| 6,467,270 B2 | 10/2002 | Mulloy et al. | |
| 6,752,132 B2 | 6/2004 | Remmels et al. | |
| 6,917,873 B2 | 7/2005 | Itoyama | |
| 7,165,403 B2 | 1/2007 | Sun et al. | |
| 7,171,805 B2 * | 2/2007 | Ruehle | 60/323 |
| 7,228,684 B2 * | 6/2007 | Gruber et al. | 60/321 |
| 7,254,948 B2 | 8/2007 | Gustafson et al. | |
| 7,281,527 B1 | 10/2007 | Bryant | |
| 7,788,923 B2 | 9/2010 | Rowells | |
| 8,201,405 B2 * | 6/2012 | Bruce et al. | 60/605.2 |
| 2005/0109025 A1 * | 5/2005 | Kenyon et al. | 60/324 |
| 2005/0274366 A1 * | 12/2005 | Sato | 60/605.2 |
| 2006/0032219 A1 * | 2/2006 | Dirker | 60/323 |
| 2006/0059908 A1 | 3/2006 | Schorn et al. | |
| 2006/0174621 A1 * | 8/2006 | Chen et al. | 60/612 |
| 2008/0216475 A1 | 9/2008 | Kasper et al. | |
| 2009/0090098 A1 | 4/2009 | Sugiyama | |
| 2009/0199825 A1 | 8/2009 | Piper et al. | |
| 2010/0011762 A1 | 1/2010 | Hokuto et al. | |
| 2010/0024416 A1 | 2/2010 | Gladden et al. | |
| 2010/0077747 A1 * | 4/2010 | Pierpont et al. | 60/605.2 |
| 2010/0154416 A1 * | 6/2010 | Bruce et al. | 60/605.2 |
| 2010/0275583 A1 | 11/2010 | Farrell et al. | |

FOREIGN PATENT DOCUMENTS

| | | | |
|---|---|---|---|
| FR | 2549529 A1 * | 1/1985 | |
| FR | 2549530 A1 * | 1/1985 | |
| FR | 2575788 A1 * | 7/1986 | |
| JP | 03000929 A * | 1/1991 | |
| JP | 07-042624 A | 2/1995 | |
| JP | 07293262 A * | 11/1995 | |

* cited by examiner

INTERNAL COMBUSTION ENGINE WITH IMPROVED EXHAUST MANIFOLD

TECHNICAL FIELD

This disclosure relates generally to an internal combustion engine and, more particularly, to an internal combustion engine with an exhaust gas recirculation system.

BACKGROUND

An exhaust gas recirculation system may be used to reduce the generation of undesirable pollutant gases during the operation of internal combustion engines. Exhaust gas recirculation systems generally recirculate exhaust gas generated during the combustion process into the intake air supply of the internal combustion engine. The exhaust gas introduced into the engine cylinders displaces a volume of the intake air supply that would otherwise be available for oxygen. Reduced oxygen concentrations lower the maximum combustion temperatures within the cylinders and slow the chemical reactions of the combustion process, which decreases the formation of oxides of nitrogen ($NO_x$).

Many internal combustion engines having such an exhaust gas recirculation system also have one or more turbochargers. Exhaust gas from the combustion cylinders is typically used to drive the turbine of the turbocharger which, in turn, drives the compressor of the turbocharger to compress fluid that is subsequently supplied to the combustion cylinders. A portion of the exhaust gas may also be diverted from the exhaust system used to drive the turbocharger and into the exhaust gas recirculation system.

U.S. Patent Publication No. US 2010/0024416 A1 discloses an internal combustion engine having a pair of cylinder banks with an exhaust gas recirculation system and a turbocharger associated with each cylinder bank. The exhaust gas recirculation is fluidly connected to one of the exhaust manifolds and results in less exhaust gas flowing through that manifold toward its associated turbocharger. The turbochargers are sized differently to account for differences in exhaust gas flow through the exhaust manifolds associated with each cylinder bank. A balance passageway may be provided to selectively allow exhaust gas to pass from one exhaust manifold to the other exhaust manifold.

The foregoing background discussion is intended solely to aid the reader. It is not intended to limit the innovations described herein nor to limit or expand the prior art discussed. Thus the foregoing discussion should not be taken to indicate that any particular element of a prior system is unsuitable for use with the innovations described herein, nor is it intended to indicate any element, including solving the motivating problem, to be essential in implementing the innovations described herein. The implementations and application of the innovations described herein are defined by the appended claims.

SUMMARY

An internal combustion engine having improved efficiency is provided. In one aspect, the internal combustion engine has a first cylinder bank and a second cylinder bank that includes a first cylinder group and a second cylinder group. A first exhaust gas line with a first exhaust manifold is connected to the first cylinder bank. A second exhaust gas line includes a second exhaust manifold. The second exhaust manifold has a first section and a second section. The first section is fluidly connected to the first cylinder group of the second cylinder bank and the second section is fluidly connected to the second cylinder group of the second cylinder bank. A first turbocharger is fluidly connected to the first exhaust gas line and a second turbocharger is fluidly connected to the second exhaust gas line. An air supply line supplies air to the first cylinder bank and the second cylinder bank. An exhaust gas recirculation system recirculates exhaust gas from the first exhaust gas line to the air supply line. An exhaust gas balance tube fluidly connects the first exhaust gas line and the second exhaust manifold. The exhaust gas balance tube is fluidly connected to the second exhaust manifold between the first section and the second section of the second exhaust manifold.

In another aspect, an internal combustion engine has a plurality of combustion cylinders defining a first cylinder group and a second cylinder group. An exhaust gas line has an exhaust manifold with a first section and a second section. The exhaust manifold has a plurality of exhaust manifold elements. Each exhaust manifold element has a duct component extending along a generally linear tube-like duct portion of the exhaust manifold and a pipe component fluidly connecting the duct component to one of the combustion cylinders. The first section of the exhaust manifold is fluidly connected to the first cylinder group and the second section of the exhaust manifold is fluidly connected to the second cylinder group. The first section includes at least one exhaust manifold element configured as a non-direction specific exhaust manifold element and the pipe component of each non-direction specific exhaust manifold element is configured as a non-direction specific pipe component fluidly connecting the duct component of the non-direction specific exhaust manifold element to one of the combustion cylinders of the first cylinder group. The second section includes at least one exhaust manifold element configured as a modular pulse exhaust manifold element with the pipe component of each modular pulse exhaust element being configured as a modular pulse pipe component fluidly connecting the duct component of the modular pulse exhaust manifold element to one of the combustion cylinders of the second cylinder group. A turbocharger is fluidly connected to the exhaust gas line and an air supply line supplies air to the combustion cylinders. An exhaust gas recirculation system recirculates exhaust gas from the exhaust gas line to the air supply line.

In another aspect, an internal combustion engine has a first cylinder bank and a second, generally parallel cylinder bank with a first cylinder group and a second cylinder group. A first exhaust gas line includes a generally linear first exhaust manifold. A second exhaust gas line includes a generally linear second exhaust manifold that is generally parallel to the first exhaust manifold and has a first section and a second section. The first section is fluidly connected to the first cylinder group of the second cylinder bank and the second section is fluidly connected to the second cylinder group of the second cylinder bank. A first turbocharger is fluidly connected to the first exhaust gas line and a second turbocharger is fluidly connected to the second exhaust gas line. An air supply line supplies air to the first cylinder bank and the second cylinder bank and an exhaust gas recirculation system recirculates exhaust gas from the first exhaust gas line to the air supply line. An exhaust gas balance tube fluidly connects the first exhaust gas line and the second exhaust manifold. The exhaust gas balance tube is fluidly connected to the second exhaust manifold at an upstream balance tube port positioned between the first section of the second exhaust manifold and the second section of the second exhaust manifold.

DETAILED DESCRIPTION

Figure 1:
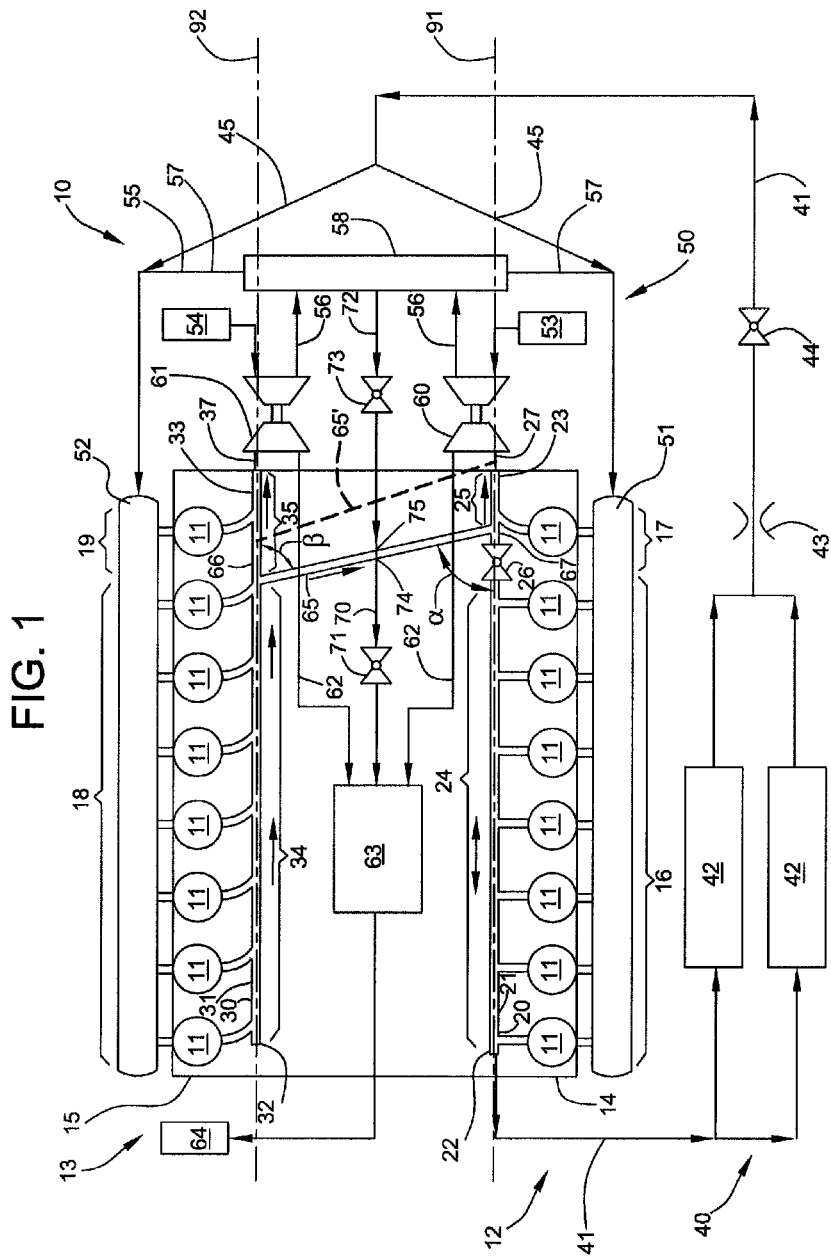
FIG. 1 is a schematic illustration of an internal combustion engine in accordance with the disclosure.

FIG. 1 depicts an internal combustion engine 10 having a plurality of combustion cylinders 11 configured as a first cylinder bank 12 and a second cylinder bank 13 generally parallel to the first cylinder bank. A first exhaust gas line 20 is fluidly connected to the first cylinder bank 12 and a second exhaust gas line 30 is fluidly connected to the second cylinder bank 13. Compressed air is supplied to the first and second cylinder banks 12, 13 by air supply line 50. An exhaust gas recirculation system 40 provides for the recirculation of exhaust gas into the air supply line 50 in order to reduce the emissions of the internal combustion engine 10.

A first cylinder head 14 is secured to the internal combustion engine 10 adjacent the first cylinder bank 12 and a second cylinder head 15 is secured to the internal combustion engine adjacent the second cylinder bank 13 of combustion cylinders. The first cylinder bank 12 includes a first cylinder group 16 and a second cylinder group 17. The second cylinder bank 13 includes a first cylinder group 18 and a second cylinder group 19. While the first cylinder group 16 of first cylinder bank 12 and the first cylinder group 18 of the second cylinder bank 13 are each depicted with seven combustion cylinders 11 and the second cylinder group 17 of the first cylinder bank 12 and the second cylinder group 19 of the second cylinder bank 13 are each depicted with one combustion cylinder 11, the combustion cylinders of each cylinder bank may be grouped as desired to define or form cylinder groups having different numbers of combustion cylinders.

First exhaust gas line 20 includes a first exhaust manifold 21 that is fluidly connected to the first cylinder bank 12. First exhaust manifold 21 has a first end 22 and an opposite exhaust end 23 with a first section 24 and a second section 25 between the two ends. An exhaust gas control valve 26 is positioned between the first section 24 and the second section 25. A first extension pipe 27 extends between the exhaust end 23 of first exhaust manifold 21 and first turbocharger 60 and fluidly connects the first exhaust manifold to the first turbocharger.

Second exhaust gas line 30 includes a second exhaust manifold 31 that is fluidly connected to the second cylinder bank 13. The second exhaust manifold 31 is generally parallel to the first exhaust manifold and has a first end 32 and an opposite exhaust end 33 with a first section 34 and a second section 35 between the two ends. A second extension pipe 37 extends between the exhaust end 33 of the second exhaust manifold 31 and second turbocharger 61 and fluidly connects the second exhaust manifold to the second turbocharger.

Exhaust gas from the first cylinder group 16 of the first cylinder bank 12 is received within the first section 24 of the first exhaust manifold 21 and, depending upon the positions of exhaust gas control valve 26 and exhaust gas recirculation valve 44, may be routed through the exhaust gas recirculation system 40. The exhaust gas recirculation system 40 includes an exhaust gas recirculation duct 41 that is fluidly connected to the first end 22 of the first exhaust gas line 20 so that exhaust gas from the first cylinder group 16 of the first cylinder bank 12 may be routed or recirculated through the exhaust gas recirculation system and introduced into the air supply line 50.

Exhaust gas passing through exhaust gas recirculation duct 41 is cooled by one or more cooling components 42. The flow rate through exhaust gas recirculation duct 41 is monitored by a flow meter 43 such as a venturi-style flow meter. An exhaust gas recirculation control valve 44 is provided along exhaust gas recirculation duct 41 to control exhaust gas flow through the exhaust gas recirculation system 40. Exhaust gas recirculation control valve 44, together with exhaust gas control valve 26, controls the amount of exhaust gas that is mixed with air that has been compressed by the first turbocharger 60 and the second turbocharger 61 prior to the air entering the first intake manifold 51 and the second intake manifold 52. The exhaust gas recirculation duct 41 of the exhaust gas recirculation system 40 splits into two separate legs 45. Each leg 45 fluidly connects to the air supply line 50 between the aftercooler 58 and the first intake manifold 51 and the second intake manifold 52, respectively.

Air supply line 50 includes a first air intake 53 through which atmospheric air enters the first turbocharger 60, a second air intake 54 through which atmospheric air enters the second turbocharger 61 and a compressed air line 55 through which compressed air is fed to combustion cylinders 11. Atmospheric air is compressed by the first and second turbochargers 60, 61 and passes through first compressed air lines 56 to aftercooler 58. Cooled compressed air exits the aftercooler 58 and enters second compressed air lines 57 that are each fluidly connected to a respective one of the first and second intake manifolds 51, 52. Each leg 45 of the exhaust gas recirculation system 40 intersects with and fluidly connects to a respective one of the second compressed air lines 57 between the aftercooler 58 and the first and second intake manifolds 51, 52. In this way, exhaust gas may be mixed with intake air provided to the combustion cylinders 11.

A portion of exhaust gas from the first cylinder group 16 of the first cylinder bank 12 is, at times, routed through the exhaust gas recirculation system 40 rather than through the first exhaust gas line 20. For this reason, a duct or exhaust gas balance tube 65 is fluidly connected between the first exhaust gas line 20 and the second exhaust gas line 30 to balance or equalize, to a controllable extent, the amount of exhaust gas passing through the first and second turbochargers 60, 61. More specifically, second exhaust manifold 31 includes an upstream balance tube connection port 66 (FIGS. 1-3) between the first section 34 of second exhaust manifold 31 and the second section 35 of the second exhaust manifold. First exhaust manifold 21 includes a downstream balance tube connection port 67 positioned between exhaust gas control valve 26 and the second section 25 of the first exhaust manifold 21. In other words, the upstream balance tube connection port 66 fluidly connects one end of exhaust gas balance tube 65 to the second exhaust manifold 31 and the downstream balance tube connection port 67 fluidly connects the opposite end of the exhaust gas balance tube to the first exhaust manifold 21 to permit exhaust gas to pass from the second exhaust gas line 30 to the first exhaust gas line 20. The exhaust gas balance tube 65 provides a path for exhaust gas to travel from second exhaust gas line 30 towards first exhaust gas line 20 to balance the flow through the first and second turbochargers 60, 61.

It should be noted that while the upstream balance tube connection port 66 is depicted as being positioned between the first section 34 of the second exhaust manifold 31 and the second section 35 of the second exhaust manifold, the upstream balance tube connection port may alternatively be positioned elsewhere along the second exhaust manifold 31 to provide the desired amount of exhaust gas through exhaust gas balance tube 65. For example, moving the upstream balance tube connection port 66 upstream or towards first end 32 of second exhaust manifold 31 will result in fewer combustion cylinders 11 being included in first cylinder group 18 of second cylinder bank 13 and thus exhaust gas from fewer combustion cylinders will be available for passage through exhaust gas balance tube 65 to first exhaust gas line 20.

Downstream balance tube connection port 67 is depicted as being positioned between the exhaust gas control valve 26 and the second section 25 of the first exhaust manifold 21. However, the downstream balance tube connection port 67 may be positioned at other locations along the first exhaust manifold 21 as well as other positions along the first exhaust gas line 20, such as that depicted in phantom at 65' in FIG. 1 and connected to the first extension pipe 27 between the first exhaust manifold and the first turbocharger 60.

Exhaust gas balance tube 65 and upstream balance tube connection port 66 engage or meet second exhaust gas line 30 at an angle "β" relative to centerline 92 of second exhaust manifold 31. In order to minimize pressure drop though the exhaust gas balance tube 65, it is believed that setting angle "β" at an angle less than ninety degrees will result in acceptable flow characteristics and setting angle "β" at less than approximately eighty degrees will further reduce the pressure drop and still smaller angles will likely reduce the pressure drop to a greater extent. The exact angle may be set by based upon air flow characteristics and desired routing of the exhaust gas balance tube 65 within the physical space limitations of the internal combustion engine.

Exhaust gas balance tube 65 and the downstream balance tube connection port 67 engage or meet first exhaust gas line 20 at an angle "α" relative to centerline 91 of first exhaust manifold 21. With this configuration, exhaust gas flowing from the second exhaust gas line 30 through exhaust gas balance tube 65 into first exhaust gas line 20 does not enter first exhaust gas line 20 in a perpendicular fashion relative to first exhaust gas line 20 and thus pressure drop through the exhaust gas balance tube 65 is reduced. In addition, since the exhaust gas traveling downstream through first exhaust gas line 20 drives the first turbocharger 60, it is desirable that the exhaust gas passing through the exhaust gas balance tube 65 into the first exhaust gas line 20 minimizes any disruption to the flow or momentum of the exhaust gas from first cylinder group 16 of first cylinder bank 12 as it passes downstream balance tube connection port 67. By positioning the downstream balance tube connection port 67 at an appropriate angle relative to the centerline of the first exhaust gas line 20, disruption of the flow through the first exhaust gas line may be reduced or minimized. It is believed that setting the angle "α" to less than ninety degrees will result in acceptable flow characteristics. It is further believed that setting the angle "α" at less than approximately seventy-five degrees will result in a configuration that will minimize disruption of air flow within the first exhaust gas line 20. The exact angle may be set based upon air flow characteristics and desired routing of the exhaust gas balance tube 65 within the physical space limitations of the internal combustion engine. It should be noted that angles "α" and "β" are not necessarily within a horizontal or a vertical plane relative to internal combustion engine 10 nor do they need to be identical angles.

Exhaust gas from the first cylinder bank 12 and second cylinder bank 13 passes through the first and second turbochargers 60, 61, respectively, and exits the turbochargers through turbocharger exhaust gas lines 62. Turbocharger exhaust gas lines 62 are fluidly connected to a filter 63 so that the exhaust gas is filtered prior to being discharged or released to the atmosphere through exhaust gas outlet 64.

Under certain operating conditions, it may be desirable to reduce the shaft speed of the first and second turbochargers 60, 61 so that the turbochargers may be maintained within a desired operating range. In order to do so, the amount of exhaust gas passing through the first and second exhaust gas lines 20, 30 may be reduced by venting or releasing a desired amount of exhaust gas from the exhaust gas lines. Such exhaust gas may be released in a relatively consistent manner from both the first and second exhaust gas lines 20, 30 by utilizing a wastegate duct 70 that is fluidly connected at wastegate interconnection 74 to exhaust gas balance tube 65 to permit exhaust gas to be released from the wastegate. A wastegate valve 71 controls or regulates the flow of exhaust gas through wastegate duct 70. By fluidly connecting wastegate duct 70 to exhaust gas balance tube 65, exhaust gas within the first and second exhaust gas lines 20, 30 may be reduced in a relatively uniform manner so that a reduction in shaft speed of the first and second turbochargers 60, 61 will also occur in a relatively uniform manner.

Under certain other operating conditions, it may be desirable to reduce the pressure within the compressed air line 55. In such case, a compressor bypass 72 and its associated compressor bypass valve 73 may be used to control or regulate the venting or release of compressed air from the compressed air line 55. However, because work has been performed (i.e., energy used) to compress the air within the compressed air line 55, such energy is wasted if the compressed air is vented or released to the atmosphere. In order to increase the efficiency of internal combustion engine 10, the compressor bypass 72 fluidly connects the compressed air line 55 at aftercooler 58 (but before the compressed air is cooled within the aftercooler) with the exhaust gas balance tube 65 at compressor bypass interconnection 75. In this way, energy used to compress the atmospheric air within the first and second turbochargers 60, 61 is conserved by re-routing the compressed air into the exhaust gas system via the exhaust gas balance tube 65 when the pressure of air in the compressed air line 55 is higher than exhaust gas pressure within the exhaust gas balance tube 65. In other words, rather than wasting the energy used to compress the air that is being vented or released to the atmosphere, some of the energy may be saved by re-routing the compressed air into the exhaust gas system which is subsequently used to drive the first and second turbochargers 60, 61. In an alternate design, the compressor bypass may extend from any portion of compressed air line 55, including a portion positioned after the aftercooler 58. In addition, the compressor bypass may be routed to fluidly connect to the exhaust gas system at a location other than the exhaust gas balance tube 65 including either or both of the first and second exhaust gas lines 20, 30.

Figure 2:
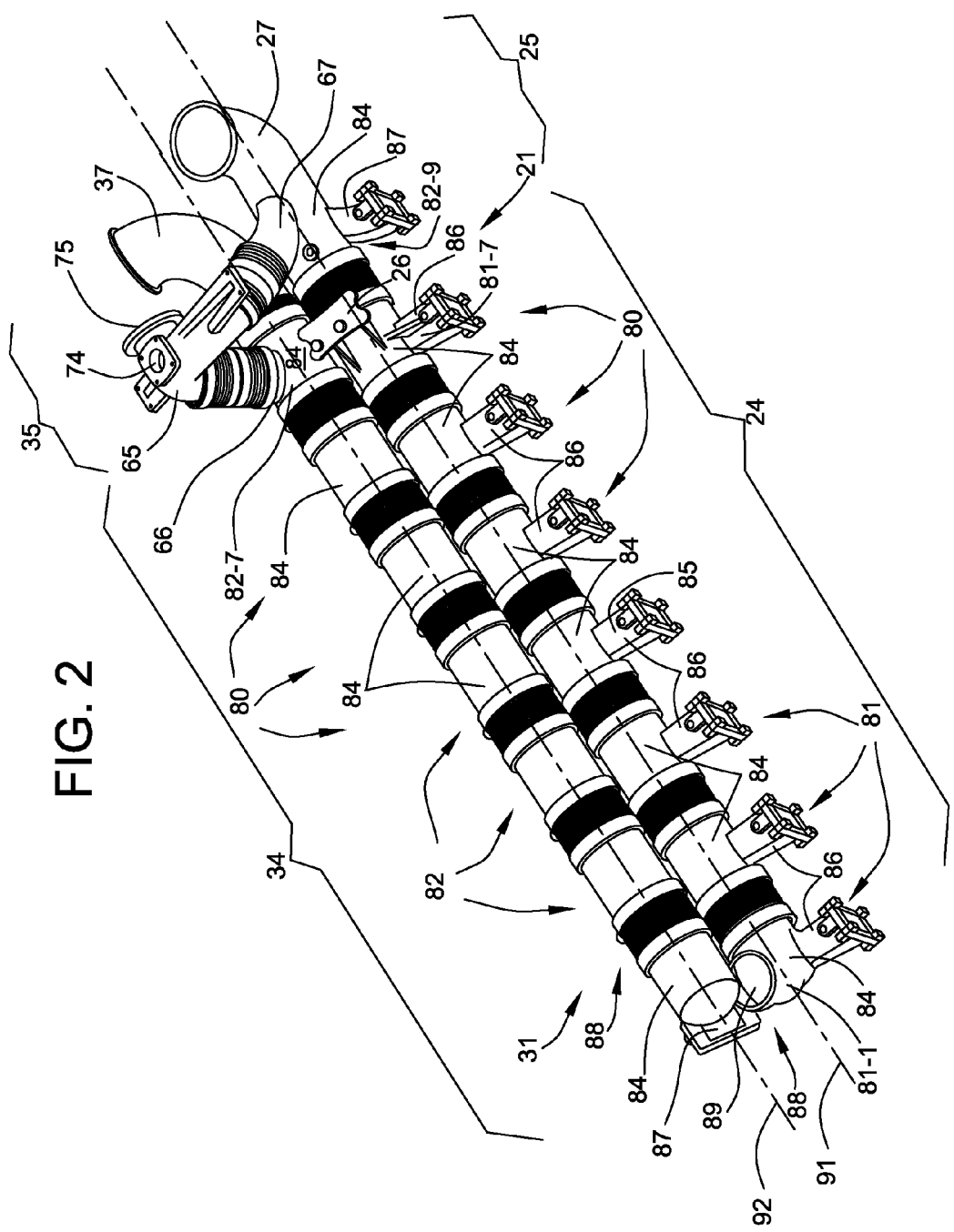
FIG. 2 is a perspective view of the exhaust manifolds and the exhaust gas balance tube in accordance with the disclosure.
Figure 3:
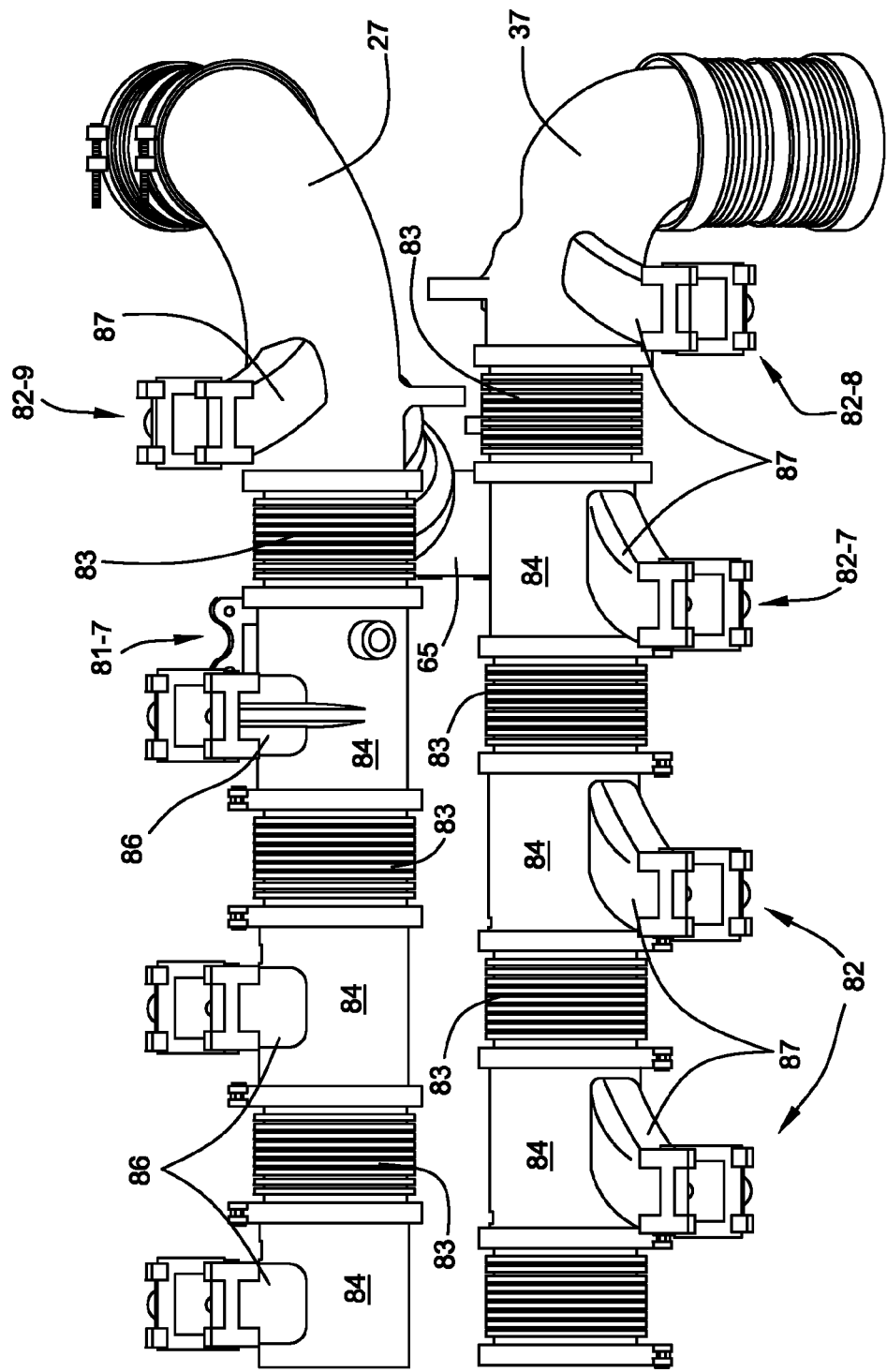
FIG. 3 is an enlarged bottom view of a portion of the exhaust manifolds and the exhaust gas balance tube of FIG. 2.

Referring to FIGS. 2-3, the first exhaust manifold 21 and the second exhaust manifold 31 are each formed of a plurality of interconnected exhaust manifold elements 80. More specifically, first exhaust manifold 21 includes seven non-direction specific exhaust manifold elements 81 that are each fluidly connected to one of the combustion cylinders 11 of the first cylinder group 16. The first exhaust manifold 21 further includes one modular pulse exhaust manifold element 82 positioned adjacent exhaust end 23 of the first exhaust manifold 21 and fluidly connected to the single combustion cylinder 11 of the second cylinder group 17 of the first cylinder bank 12. Each of the non-direction specific exhaust manifold elements 81 and the modular pulse exhaust manifold element 82 is mechanically and fluidly connected to an adjacent manifold element by connecting members 83. The connecting members 83 may be formed with a bellows, a slip-fit joint or another structure that is capable of expanding and contracting to compensate for thermal expansion of the exhaust manifold elements 80. Each exhaust manifold element 80 includes a generally cylindrical hollow duct component 84 and a hollow pipe component 85 for fluidly connecting a combustion cylinder 11 to the duct component 84. The duct components 84 of the exhaust manifold elements 80 are spaced apart in an array connected by the connecting members 83 to form a generally linear tube-like duct portion 88 of the first exhaust manifold for directing exhaust gas from each combustion cylinder towards the exhaust end 23 of the first exhaust manifold. In other words, each of the connecting members 83 and duct components 84 is positioned along and forms a section of the generally linear tube-like duct portion 88.

All of the non-direction specific exhaust manifold elements 81 and the modular pulse exhaust manifold element 82 have generally identical duct components 84 except as described below. Non-direction specific exhaust manifold element 81 has a non-direction specific pipe component 86 that generally extends from the first cylinder head 14 in a generally straight manner to duct component 84. In the depicted embodiment, the non-direction specific pipe components 86 are generally perpendicular to axis 91 of first exhaust manifold 21 so that the non-direction specific exhaust manifold elements have a generally "T-shaped" configuration.

Modular pulse exhaust manifold element 82 has a curved modular pulse pipe component 87 that generally extends from the first cylinder head 14 and fluidly connects the combustion cylinder 11 of the second cylinder group 17 of the first cylinder bank 12 to the duct component 84 of the modular pulse exhaust manifold element 82. The modular pulse pipe component 87 is configured to direct exhaust gas from a combustion cylinder 11 into the first exhaust manifold in a direction specific or direction biased exhaust flow pattern that includes the generation of a series of pulses of exhaust gas. In addition, the shape of the modular pulse pipe component 87 combined with the duct component 84 directs the exhaust gas towards the exhaust end 23 of the first exhaust manifold 21 and thus towards the first turbocharger 60.

The second exhaust manifold 31 is constructed in a manner similar to first exhaust manifold 21 and also has eight exhaust manifold elements 80. However, all of the exhaust manifold elements are modular pulse exhaust manifold elements 82 in order to direct exhaust gas from the second cylinder bank 13 and through the second exhaust gas line 30 towards the second turbocharger 61.

In the embodiment depicted in FIGS. 1-3, each of the exhaust manifold elements of the first exhaust manifold 21 associated with the first cylinder group 16 of first cylinder bank 12 is a non-direction specific exhaust manifold element 81 while the exhaust manifold element associated with the second cylinder group 17 of the first cylinder bank 12 is a modular pulse exhaust manifold element 82. As such, the first exhaust manifold 21 has both non-direction specific exhaust manifold elements 81 and a modular pulse exhaust manifold element 82.

By configuring the exhaust manifold elements of the first section 24 of the first exhaust manifold as non-direction specific exhaust manifold elements, exhaust gas may flow more easily towards the exhaust end 23 of first exhaust manifold 21 as well as towards exhaust gas recirculation system 40. If the exhaust manifold elements of the first section 24 of the first exhaust manifold were modular pulse exhaust manifold elements, the exhaust gas from the first section would be primarily directed towards exhaust end 23 of the first manifold. With such a modular pulse configuration, in order to increase the amount of exhaust gas being recirculated through the exhaust gas recirculation system 40, the exhaust gas control valve 26 would be closed to a greater extent than if, as disclosed herein, the first exhaust manifold includes both non-direction specific exhaust manifold elements and modular pulse exhaust manifold elements. As a result, the configuration of the first exhaust manifold 21 results in a more efficient structure for the recirculation of exhaust gas.

The exhaust manifold elements may also include additional features and functionality. For example, non-direction specific exhaust manifold element 81-1 adjacent first end 22 of first exhaust manifold 21 has an opening 89 for fluidly connecting first exhaust manifold element 21 to exhaust gas recirculation duct 41. Non-direction specific exhaust manifold element 81-7 includes exhaust gas control valve 26 to define the first cylinder group 16 and the second cylinder group 17. Modular pulse exhaust manifold element 82-9 of first exhaust manifold 21 includes the downstream balance tube connection port 67 for fluidly connecting to exhaust gas balance tube 65 and also includes the first extension pipe 27 in the shape of a curved end component for fluidly connecting to first turbocharger 60. Modular pulse exhaust manifold element 82-7 of second exhaust manifold 31 includes the upstream balance tube connection port 66 for fluidly connecting to exhaust gas balance tube 65. Modular pulse exhaust manifold element 82-8 (FIG. 3) of second exhaust manifold 31 includes the second extension pipe 37 in the shape of a curved end component for fluidly connecting to second turbocharger 61.

Exhaust manifolds with other combinations of non-direction specific exhaust manifold elements and modular pulse exhaust manifold elements may also be used. For example, referring to FIG. 4, an alternate embodiment of an internal combustion engine 110 is depicted. Identical or similar components to those of the embodiment depicted in FIG. 1 are identified with identical reference numbers. In this embodiment, each of the first cylinder bank 112 and second cylinder bank 113 includes six combustion cylinders 11. Accordingly, the first intake manifold 151 and second intake manifold 152 are configured to supply air to the reduced number of combustion cylinders. Similarly, each of the first exhaust manifold 121 and the second exhaust manifold 131 includes six exhaust manifold elements 80 connected to the combustion cylinders. Exhaust gas control valve 26 is positioned generally towards the center of first exhaust manifold 121 such that first cylinder group 116 of the first cylinder bank 112 includes three combustion cylinders and second cylinder group 117 of the first cylinder bank 112 also includes three combustion cylinders. Each exhaust manifold element 80 associated with the first cylinder group 116 is configured as a non-direction specific exhaust manifold element 81 and each exhaust manifold element associated with the second cylinder group 117 of the first cylinder bank 112 is configured as a modular pulse exhaust manifold element 82 to more efficiently direct exhaust gas towards first turbocharger 60. More specifically, since exhaust gas from the first cylinder group 116 of first cylinder bank 112 may be directed either towards the exhaust gas recirculation system 40 or towards first turbocharger 60, each exhaust manifold element associated with the first cylinder group is configured as a non-direction specific exhaust manifold element 81. The exhaust manifold elements associated with the second cylinder group are only directed towards the first turbocharger 60 and are configured as modular pulse exhaust manifold elements 82. Each exhaust manifold element of the second exhaust manifold 131 is configured as a modular pulse exhaust manifold element 82.

Figure 4:
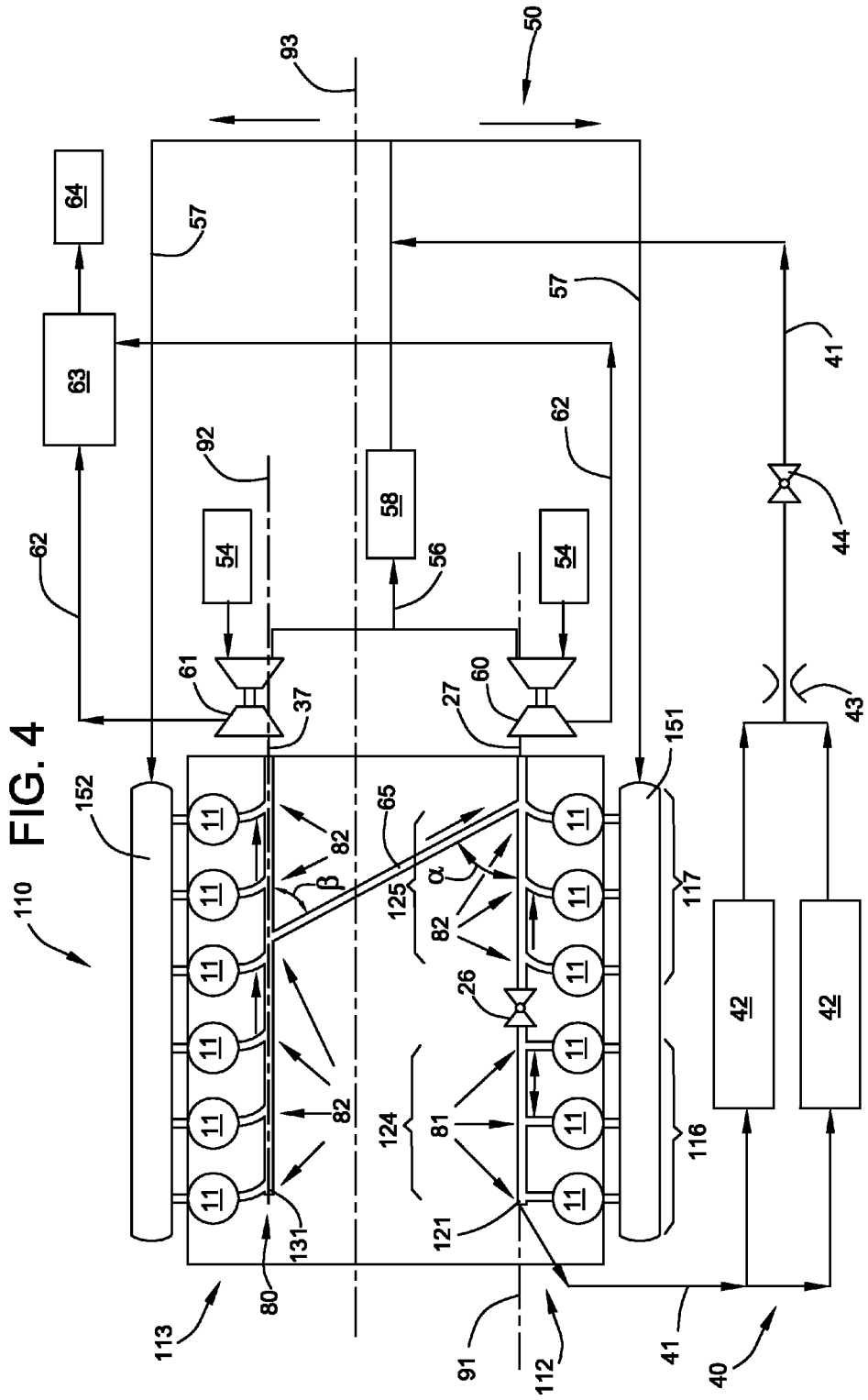
FIG. 4 is a schematic illustration of an internal combustion engine of an alternate embodiment.
Figure 5:
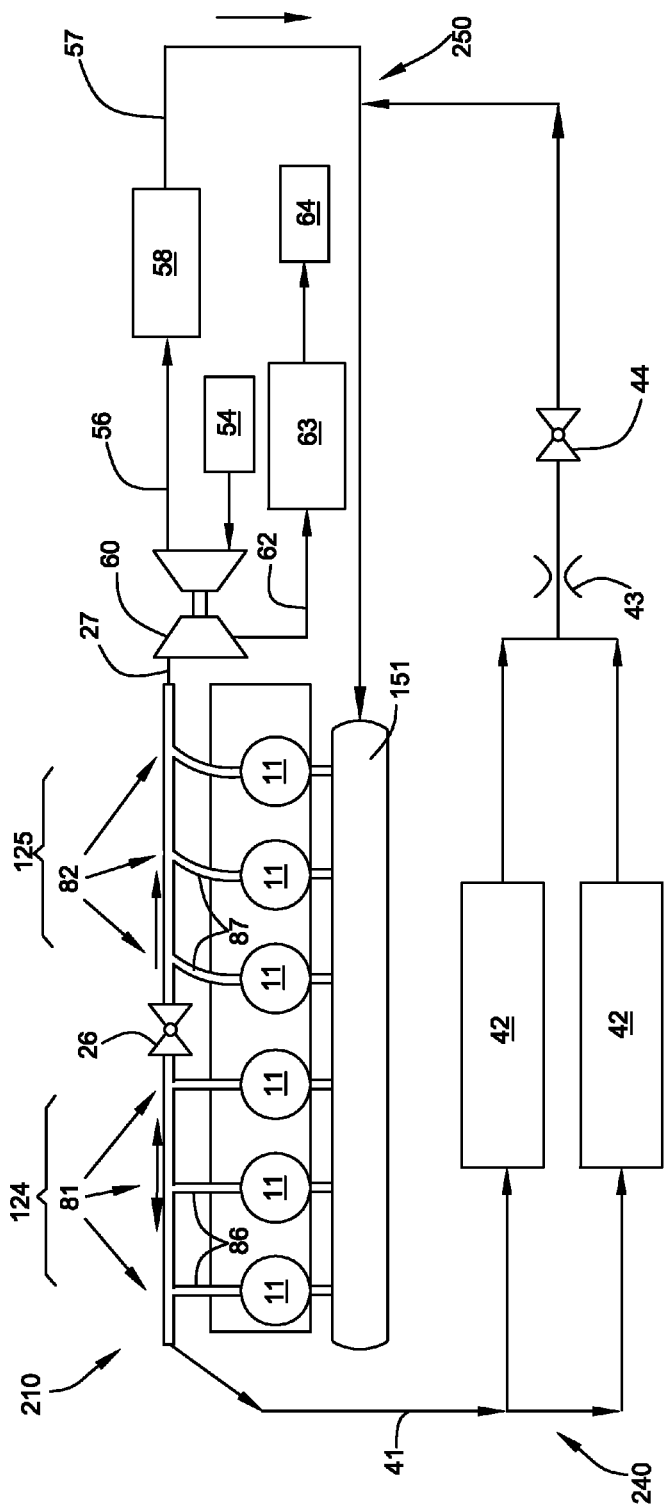
FIG. 5 is a schematic illustration of an internal combustion engine of an alternate embodiment having a single bank of combustion cylinders.

Although the internal combustion engines 10, 110 depicted in FIGS. 1, 4 each includes two cylinder banks, certain aspects of the present disclosure may be used with internal combustion engines having a single, in-line bank of combustion cylinders. FIG. 5 depicts an internal combustion engine 210 similar to internal combustion engine 110 of FIG. 6 but having only a single, in-line cylinder bank 212. Identical or similar components of the embodiment depicted in FIG. 4 are identified with identical reference numbers. Internal combustion engine 210 is substantially identical to the portion of internal combustion engine 110 below line 93 in FIG. 4 except that the exhaust gas recirculation system 240 and the air supply line 250 are modified to reflect the single cylinder bank.

Industrial Applicability

The industrial applicability of the system described herein will be readily appreciated from the foregoing discussion. The present disclosure is applicable to many internal combustion engines. One exemplary type of such an internal combustion engine is one that utilizes an exhaust gas recirculation system. The internal combustion engine may utilize an exhaust gas balance tube that extends between a first exhaust gas line and a second exhaust manifold with the balance tube intersecting the second exhaust manifold at an intermediate position spaced from its ends. The internal combustion engine may utilize an exhaust manifold fluidly connected to an exhaust gas recirculation system and having a plurality of exhaust manifold elements including at least one non-direction specific exhaust manifold element and at least one modular pulse exhaust manifold element. The internal combustion engine may utilize a wastegate that is fluidly connected to an exhaust gas balance tube with the exhaust gas balance tube being fluidly connected to first and second exhaust gas lines. The internal combustion engine may utilize a compressor bypass that fluidly connects a compressed air line to an exhaust gas balance tube with the exhaust gas balance tube being fluidly connected to first and second exhaust gas lines. Depending upon the configuration of the internal combustion engine and the desired operating characteristics, each of these aspects may be utilized individually or in combination to improve the operating efficiency of an internal combustion engine.

During operation, exhaust gas exits the first cylinder bank 12 and enters first exhaust manifold 21. The flow of exhaust gas from the first cylinder group 16 towards first turbocharger 60 and through exhaust gas recirculation system 40 is controlled by the position of exhaust gas control valve 26 and by the position of exhaust gas recirculation control valve 44. At start up and some idle conditions, the exhaust gas recirculation control valve 44 may be completely closed. Also in such operating conditions, the exhaust gas control valve 26 may be completely open such that exhaust gas from the first cylinder bank 12 travels through first exhaust manifold 21 and first extension pipe 27 into first turbocharger 60. More specifically, the closed exhaust gas recirculation control valve 44 allows exhaust gas from the first cylinder group 16 of first cylinder bank 12 to pass through the non-direction specific exhaust manifold elements 81 and past exhaust gas control valve 26 towards first turbocharger 60. Exhaust gas from the second cylinder group 17 travels through the modular pulse exhaust manifold element 82 towards first turbocharger 60. Exhaust gas from the second cylinder bank 13 travels through the modular pulse exhaust manifold elements 82 of the second exhaust manifold 31 and second extension pipe 37 into second turbocharger 61. Since no exhaust gas is being recirculated through the exhaust gas recirculation system 40, exhaust gas from the first cylinder bank 12 is entirely directed towards the first turbocharger 60. Thus the pressure within the first and second manifolds 21, 31 will be generally equal and little, if any, exhaust gas will travel through the exhaust gas balance tube 65 from the second manifold 31 to the first manifold 21.

As engine speed and load increase, it is desirable to increase the amount of exhaust gas being recirculated. In doing so, exhaust gas recirculation control valve 44 is utilized to initially control the flow through the exhaust gas recirculation system 40. Since the exhaust manifold elements 80 of first cylinder group 16 of first cylinder bank 12 are non-direction specific exhaust manifold elements, some of the exhaust gas will pass through exhaust gas recirculation system 40 even with exhaust gas control valve 26 fully open. Once the exhaust gas recirculation control valve 44 is fully open, further increases in the amount of recirculated exhaust gas can be accomplished by gradually closing the exhaust gas control valve 26.

As more exhaust gas is recirculated through exhaust gas recirculation system 40, less exhaust gas from the first cylinder group 16 of first cylinder bank 12 passes through first exhaust manifold 21 into first turbocharger 60. The reduction in exhaust gas flow within the first cylinder bank results in a pressure differential between the first exhaust manifold 21 and the second exhaust manifold 31. As a result of greater pressure within second exhaust manifold 31 due to the recirculation of some of the exhaust gas from the first cylinder bank, exhaust gas in the second cylinder bank 13 passes from second exhaust manifold 31 through exhaust gas balance tube 65 into first exhaust manifold 21 to balance the flow through the first and second exhaust manifolds. More specifically, some of the exhaust gas from the first cylinder group 18 of the second cylinder bank 13 will travel along first section 34 of second exhaust manifold 31 and enter upstream balance tube connection port 66 and pass through exhaust gas balance tube 65 and downstream balance tube connection port 67 into first exhaust manifold 21. As a result of such configuration, exhaust gas from the first cylinder group 18 of the second cylinder bank 13 that passes through balance tube 65 combines with the exhaust gas from the second cylinder group 17 of the first cylinder bank 12. Also, exhaust gas from the first cylinder group 16 of the first cylinder bank 12 that has not been diverted to the exhaust gas recirculation system 40 enters first extension pipe 27 to drive the first turbocharger 60. Exhaust gas from the first cylinder group 18 of the second cylinder bank 13 that does not pass through the exhaust gas balance tube 65 enters the second section 35 of the second exhaust manifold 31 and, together with exhaust gas from the second cylinder group 19 of the second cylinder bank 13, enters the second extension pipe 37 to drive second turbocharger 61.

Rotation of the first turbocharger 60 compresses air drawn in through the first air intake 53 and rotation of second turbocharger 61 compresses air drawn in through the second air intake 54. The compressed air is routed through first compressed air line 56 and through aftercooler 58. After exiting aftercooler 58, compressed air is mixed with exhaust gas flowing through the exhaust gas recirculation system 40. The combined compressed air and recirculated exhaust gas passes through the compressed air line 55 into the first intake manifold 51 and the second intake manifold 52.

When the rotational speed of the shafts of the first turbocharger 60 and/or the second turbocharger 61 is too high, the amount of exhaust gas within the first exhaust gas line 20 and second exhaust gas line 30 may be reduced by opening the wastegate valve 71 so that exhaust gas within the exhaust gas balance tube 65 may be vented or released to reduce the speed of the first turbocharger 60 and second turbocharger 61. In some circumstances, it is desirable to increase the mass flow through the first turbocharger 60 and the second turbocharger 61 by opening compressor bypass valve 73 and thus permit compressed air to pass from the aftercooler 58 to the exhaust gas balance tube 65. In such case, the use of the compressor bypass 72 increases the rotational speed of the shafts of the first turbocharger 60 and the second turbocharger 61.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An internal combustion engine having a plurality of combustion cylinders, comprising:
    a first cylinder bank;
    a second cylinder bank having a first cylinder group and a second cylinder group;
    a first exhaust gas line fluidly connected to the first cylinder bank, the first exhaust gas line including a first exhaust manifold;
    a second exhaust gas line including a second exhaust manifold, the second exhaust manifold having a first section and a second section, the first section being fluidly connected to the first cylinder group of the second cylinder bank and the second section being fluidly connected to the second cylinder group of the second cylinder bank;
    a first turbocharger fluidly connected to the first exhaust gas line;
    a second turbocharger fluidly connected to the second exhaust gas line;
    an air supply line for supplying air to the first cylinder bank and the second cylinder bank;
    an exhaust gas recirculation system for recirculating exhaust gas from the first exhaust gas line to the air supply line; and
    an exhaust gas balance tube fluidly connecting the first exhaust gas line and the second exhaust manifold, the exhaust gas balance tube being fluidly connected to the second exhaust manifold between the first section of the second exhaust manifold and the second section of the second exhaust manifold.

2. The internal combustion engine of claim 1, wherein the first cylinder bank has a first cylinder group and a second cylinder group, the first exhaust manifold has a first section and a second section, the first section being fluidly connected to the first cylinder group of the first cylinder bank and the second section being fluidly connected to the second cylinder group of the first cylinder bank, and the exhaust gas recirculation system recirculates exhaust gas from the first cylinder group of the first cylinder bank.

3. The internal combustion engine of claim 2, further including an exhaust control valve between the first section of the first exhaust manifold and the second section of the first exhaust manifold, and the exhaust gas balance tube is fluidly connected to the first exhaust gas line between the exhaust control valve and the first turbocharger.

4. The internal combustion engine of claim 1, wherein the first exhaust gas line has a first end and an exhaust end and an exhaust control valve between the first end and the exhaust end, the exhaust gas balance tube being fluidly connected to the first exhaust gas line between the exhaust control valve and the first turbocharger.

5. The internal combustion engine of claim 4, wherein the exhaust gas balance tube intersects with the first exhaust gas line at an angle of less than 90 degrees.

6. The internal combustion engine of claim 4, wherein the exhaust gas balance tube intersects with the first exhaust gas line at an angle of less than approximately 75 degrees.

7. The internal combustion engine of claim 1, wherein each of the first exhaust manifold and the second exhaust manifold includes a generally linear tube-like duct portion and a plurality of exhaust manifold elements positioned along the duct portion, and each exhaust manifold element has a duct component positioned along and forming a section of the generally linear tube-like duct portion of one of the first exhaust manifold and the second exhaust manifold and a pipe component fluidly connecting the duct component to a combustion cylinder.

8. An internal combustion engine comprising:
    a first cylinder bank;
    a second cylinder bank having a first cylinder group and a second cylinder group, the second cylinder bank being generally parallel to the first cylinder bank;
    a first exhaust gas line fluidly connected to the first cylinder bank, the first exhaust gas line including a generally linear first exhaust manifold;
    a second exhaust gas line including a generally linear second exhaust manifold, the second exhaust manifold being generally parallel to the first exhaust manifold and having a first section and a second section, the first section being fluidly connected to the first cylinder group of the second cylinder bank and the second section being fluidly connected to the second cylinder group of the second cylinder bank;
    a first turbocharger fluidly connected to the first exhaust gas line;
    a second turbocharger fluidly connected to the second exhaust gas line;
    an air supply line for supplying air to the first cylinder bank and the second cylinder bank;
    an exhaust gas recirculation system for recirculating exhaust gas from the first exhaust gas line to the air supply line; and
    an exhaust gas balance tube fluidly connecting the first exhaust gas line and the second exhaust manifold, the exhaust gas balance tube being fluidly connected to the second exhaust manifold at an upstream balance tube port positioned between the first section of the second exhaust manifold and the second section of the second exhaust manifold.

9. The internal combustion engine of claim 8, wherein each of the first exhaust manifold and the second exhaust manifold includes a generally linear tube-like duct portion and a plurality of exhaust manifold elements, and each exhaust manifold element has a duct component positioned along and forming a section of a generally linear tube-like duct portion of one of the first exhaust manifold and the second exhaust manifold and a pipe component fluidly connecting the duct component to a combustion cylinder.

10. The internal combustion engine of claim 8, wherein the exhaust gas balance tube intersects with the first exhaust gas line at an angle of less than 90 degrees.

11. An internal combustion engine comprising:
a first cylinder bank having a plurality of combustion cylinders, the plurality of combustion cylinders defining a first cylinder group and a second cylinder group;
an exhaust gas line having an exhaust manifold with a first end and an exhaust end, the exhaust manifold having a first section and a second section with the second section being closer to the exhaust end than the first section, and an exhaust gas control device positioned between the first section and the second section, the exhaust manifold having a plurality of exhaust manifold elements, each exhaust manifold element having a duct component extending along a generally linear tube-like duct portion of the exhaust manifold and a pipe component fluidly connecting the duct component to one of the combustion cylinders, the first section of the exhaust manifold being fluidly connected to the first cylinder group and the second section of the exhaust manifold being fluidly connected to the second cylinder group, the first section including at least one exhaust manifold element configured as a non-direction specific exhaust manifold element, the pipe component of each non-direction specific exhaust manifold element being a non-direction specific pipe component fluidly connecting the duct component of the non-direction specific exhaust manifold element to one of the combustion cylinders of the first cylinder group, and the second section including at least one exhaust manifold element configured as a modular pulse exhaust manifold element, the pipe component of each modular pulse exhaust manifold element being a modular pulse pipe component fluidly connecting the duct component of the modular pulse exhaust manifold element to one of the combustion cylinders of the second cylinder group;
a turbocharger fluidly connected to the exhaust gas line;
an air supply line for supplying air to the combustion cylinders;
an exhaust gas recirculation system for recirculating exhaust gas from the exhaust gas line to the air supply line; and
a second cylinder bank, a second exhaust gas line having a second exhaust manifold fluidly connected to the second cylinder bank, the second exhaust manifold having a first end and an exhaust end, and a plurality of the exhaust manifold elements configured as modular pulse exhaust manifold elements, the pipe component of each modular pulse exhaust manifold element being a modular pulse pipe component fluidly connecting the duct component of the modular pulse exhaust manifold element to one of the plurality of combustion cylinders of the second cylinder bank and having a direction biased flow pattern to generate an exhaust gas flow generally in a direction towards the exhaust end of the second exhaust manifold, and a second turbocharger fluidly connected to the second exhaust gas line; and
an exhaust gas balance tube fluidly connecting the exhaust manifold and the second exhaust manifold, the second exhaust manifold having a first section and a second section, the first section of the second exhaust manifold being fluidly connected to a first cylinder group of the plurality of combustion cylinders of the second cylinder bank and the second section of the second exhaust manifold being fluidly connected to a second cylinder group of the plurality of combustion cylinders of the second cylinder bank, and the exhaust gas balance tube being fluidly connected to the second exhaust manifold between the first section of the second exhaust manifold and the second section of the second exhaust manifold.

12. The internal combustion engine of claim 11, wherein the exhaust manifold has a generally linear tube-like portion, and each exhaust manifold element has a duct component positioned along and forming a section of the generally linear tube-like duct portion and a pipe component fluidly connecting the duct component to one of the plurality of combustion cylinders is generally linear.

13. The internal combustion engine of claim 11, wherein each modular pulse pipe component is configured to direct a direction specific exhaust gas flow pattern including a series of pulses towards the turbocharger.

14. The internal combustion engine of claim 11, wherein the exhaust manifold further includes a connecting member between each duct component.

15. The internal combustion engine of claim 14, wherein each connecting member is configured to compensate for thermal expansion of the duct components.

16. The internal combustion engine of claim 11, wherein the exhaust gas control device is an exhaust gas control valve.

17. The internal combustion engine of claim 11, wherein the exhaust gas recirculation system recirculates exhaust gas from the first section of the exhaust manifold.

18. The internal combustion engine of claim 11, wherein the exhaust gas balance tube is fluidly connected to the exhaust manifold between the exhaust gas control device and the turbocharger.

* * * * *